(12) United States Patent
Shi et al.

(10) Patent No.: US 9,001,628 B1
(45) Date of Patent: Apr. 7, 2015

(54) ASSISTANT WAVEGUIDES FOR EVALUATING MAIN WAVEGUIDE COUPLING EFFICIENCY AND DIODE LASER ALIGNMENT TOLERANCES FOR HARD DISK

(71) Applicant: Western Digital (Fremont), LLC, Fremont, CA (US)

(72) Inventors: Zhong Shi, Dublin, CA (US); Paul Lin, Fremont, CA (US); Michael V. Morelli, San Jose, CA (US); Weigang Wang, Sunnyvale, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/229,416

(22) Filed: Mar. 28, 2014

Related U.S. Application Data

(60) Provisional application No. 61/916,750, filed on Dec. 16, 2013.

(51) Int. Cl.
| | |
|---|---|
| *G11B 11/105* | (2006.01) |
| *G11B 13/08* | (2006.01) |
| *G11B 27/36* | (2006.01) |
| *G11B 5/48* | (2006.01) |

(52) U.S. Cl.
CPC ............... *G11B 13/08* (2013.01); *G11B 27/36* (2013.01); *G11B 5/4866* (2013.01)

(58) Field of Classification Search
CPC ........... G11B 11/105; G11B 11/10534; G11B 5/4866; G11B 5/6088; G11B 2005/0021
USPC ........ 360/59; 369/13.11, 13.24, 13.32, 13.33, 369/13.02, 13.12, 112.09, 112.14, 12.21, 369/112.27, 13.2, 112.21
See application file for complete search history.

(56) References Cited

U.S. PATENT DOCUMENTS

| | | | |
|---|---|---|---|
| 5,357,536 | A | 10/1994 | Andrews |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |

(Continued)

OTHER PUBLICATIONS

U.S. Appl. No. 13/332,293 to Lei Wang, et al., filed Dec. 20, 2011, 31 pages.

(Continued)

*Primary Examiner* — Thomas Alunkal

(57) ABSTRACT

A heat assisted magnetic recording (HAMR) transducer on a slider and including first and second opposing surfaces, wherein the first surface is aligned to an air bearing surface (ABS) of the slider and the second surface is aligned to a surface of the slider opposite the ABS, a target waveguide having an entrance at the second surface, the target waveguide being configured to direct energy provided by a light source from the entrance toward the first surface, wherein the target waveguide expands in cross-section area with distance from the entrance to form an inverse taper waveguide, a plurality of assistant waveguides each having an entrance at the second surface, wherein the plurality of assistant waveguides are configured to direct energy to the plurality of output devices.

21 Claims, 4 Drawing Sheets

(56) References Cited

U.S. PATENT DOCUMENTS

| | | |
|---|---|---|
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,627,096 B2 | 9/2003 | Sherrer et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |

(56) References Cited

U.S. PATENT DOCUMENTS

| | | |
|---|---|---|
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,582 B2 | 6/2004 | Shimoda et al. |
| 6,744,608 B1 | 6/2004 | Chen et al. |
| 6,747,257 B1 | 6/2004 | Farnsworth et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,838,689 B1 | 1/2005 | Deng et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,356 B2 | 3/2007 | Ishii et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,310,206 B2 * | 12/2007 | Liu et al. .................... 360/317 |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |

(56) References Cited

U.S. PATENT DOCUMENTS

| | | |
|---|---|---|
| 7,386,933 B1 | 6/2008 | Krounbi et al. |
| 7,389,577 B1 | 6/2008 | Shang et al. |
| 7,405,093 B2 | 7/2008 | Andrews |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,480,214 B2 | 1/2009 | Challener et al. |
| 7,493,688 B1 | 2/2009 | Wang et al. |
| 7,502,397 B2 | 3/2009 | Naganuma |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,522,649 B2 | 4/2009 | Ha et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,688,689 B2 | 3/2010 | Gage et al. |
| 7,691,434 B1 | 4/2010 | Zhang et al. |
| 7,695,761 B1 | 4/2010 | Shen et al. |
| 7,710,686 B2 | 5/2010 | Kim et al. |
| 7,719,795 B2 | 5/2010 | Hu et al. |
| 7,724,470 B2 | 5/2010 | Poon et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,808,744 B2 | 10/2010 | Burbank et al. |
| 7,819,979 B1 | 10/2010 | Chen et al. |
| 7,829,264 B1 | 11/2010 | Wang et al. |
| 7,843,074 B2 | 11/2010 | Gao et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,898,759 B2 | 3/2011 | Matsumoto et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,248,898 B2 | 8/2012 | Schreck et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |

(56) References Cited

U.S. PATENT DOCUMENTS

| | | |
|---|---|---|
| 8,349,195 B1 | 1/2013 | Si et al. |
| 8,351,307 B1 | 1/2013 | Wolf et al. |
| 8,357,244 B1 | 1/2013 | Zhao et al. |
| 8,358,565 B2 * | 1/2013 | Komura et al. ............ 369/13.33 |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,887 B2 | 3/2013 | Iwanabe et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,488,435 B2 | 7/2013 | Snyder |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,619,514 B1 * | 12/2013 | Matsumoto ................ 369/13.33 |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,842,506 B1 * | 9/2014 | Matsumoto et al. ....... 369/13.33 |
| 8,861,124 B1 * | 10/2014 | Finot et al. ..................... 360/59 |
| 2002/0110335 A1 | 8/2002 | Wagner et al. |
| 2002/0163865 A1 | 11/2002 | Zimmer et al. |
| 2006/0005216 A1 | 1/2006 | Rausch |
| 2006/0233061 A1 * | 10/2006 | Rausch et al. ............ 369/13.32 |
| 2007/0015313 A1 | 1/2007 | Kwak et al. |
| 2007/0081427 A1 | 4/2007 | Suh et al. |
| 2008/0158730 A1 | 7/2008 | Furukawa et al. |
| 2008/0204916 A1 * | 8/2008 | Matsumoto et al. ............ 360/59 |
| 2008/0316202 A1 | 12/2008 | Shimizu et al. |
| 2009/0059411 A1 | 3/2009 | Tanaka et al. |
| 2010/0208378 A1 | 8/2010 | Seigler et al. |
| 2010/0208391 A1 | 8/2010 | Gokemeijer |
| 2010/0290157 A1 | 11/2010 | Zhang et al. |
| 2011/0086240 A1 | 4/2011 | Xiang et al. |
| 2011/0141862 A1 | 6/2011 | Arai et al. |
| 2012/0092971 A1 * | 4/2012 | Schreck et al. ............ 369/13.24 |
| 2012/0111826 A1 | 5/2012 | Chen et al. |
| 2012/0127838 A1 | 5/2012 | Komura et al. |
| 2012/0163137 A1 | 6/2012 | Wang et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0327751 A1 * | 12/2012 | Iwanabe et al. ............ 369/13.02 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0133283 A1 * | 5/2014 | Maletzky et al. .......... 369/13.33 |

OTHER PUBLICATIONS

U.S. Appl. No. 13/908,968 to Paul Lin, et al., filed Jun. 3, 2013, 34 pages.

* cited by examiner

ASSISTANT WAVEGUIDES FOR EVALUATING MAIN WAVEGUIDE COUPLING EFFICIENCY AND DIODE LASER ALIGNMENT TOLERANCES FOR HARD DISK

CROSS-REFERENCE TO RELATED APPLICATION

This application claims the benefit of U.S. Provisional Application Ser. No. 61/916,750, filed on Dec. 16, 2013, which is expressly incorporated by reference herein in its entirety.

BACKGROUND

The disclosure relates to heat assisted magnetic recording (HAMR), and particularly to measuring coupling efficiency from a laser to an inverse taper waveguide and laser alignment offset.

Information storage devices are used to retrieve and/or store data in computers and other consumer electronics devices. Energy assisted magnetic recording (EAMR) or heat assisted magnetic recording (HAMR) technology may be used to increase areal density (AD) of hard disks. A laser beam is delivered through an optical target waveguide and excites a near field transducer (NFT) at an air bearing surface (ABS) adjacent the magnetic disk surface. The NFT generates a very strong localized electromagnetic field. When the localized electromagnetic field is close enough to the magnetic recording medium, the recording medium absorbs part of the localized electromagnetic field and heats up in a region limited in part by the small dimension of the NFT. This heating lowers the coercivity of the magnetic medium locally and enables a write pole to magnetize the media with high density, which helps to realize the magnetic recording process with increased AD.

Efficient coupling of the laser beam with the optical waveguide results in efficient high density writing to the disk. Hence there is a need in the art for methods and structures to facilitate measurement and alignment of the laser source with the optical waveguide to obtain an optimized optical energy coupling.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
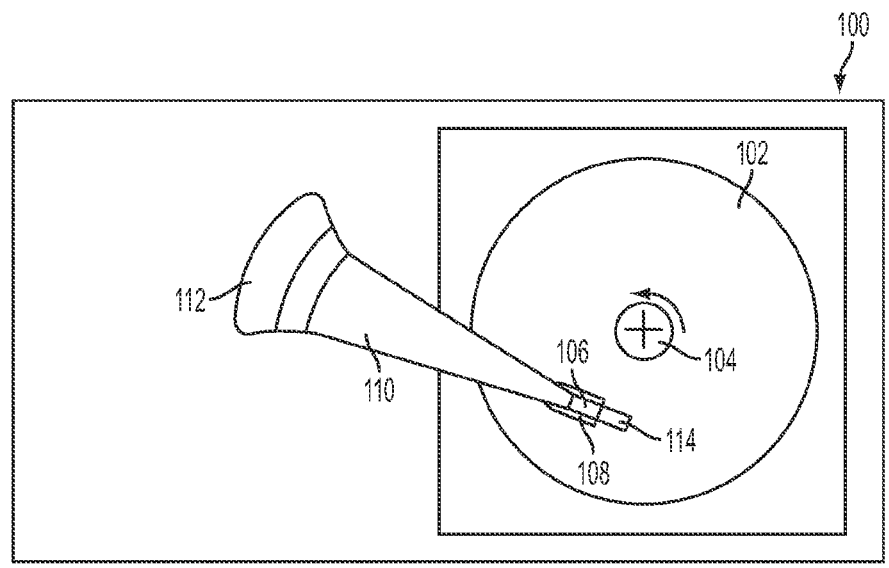
FIG. 1 is a conceptual plan view of an exemplary embodiment of a HAMR disk drive.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context of a HAMR transducer on a slider having assist waveguides for evaluating main waveguide coupling and diode laser alignment tolerances for hard disk drives. However, those skilled in the art will realize that these aspects may be extended to other apparatuses and methods. Accordingly, any reference to a specific apparatus or method is intended only to illustrate the various aspects of the present invention, with the understanding that such aspects may have a wide range of applications.

Various aspects of apparatuses will now be presented. An exemplary embodiment of an apparatus may comprise a HAMR transducer on a slider having first and second opposing surfaces, wherein the first surface is aligned to an air bearing surface (ABS) of the slider and the second surface is aligned to a surface of the slider opposite the ABS. The HAMR transducer may include a target waveguide having an entrance at the second surface, the target waveguide being configured to direct energy provided by a light source from the entrance toward the first surface, wherein the target waveguide expands in cross-section area with distance from the entrance to form an inverse taper waveguide. The HAMR transducer may also have a plurality of assistant waveguides each having an entrance at the second surface, wherein the plurality of assistant waveguides are configured to direct energy to the plurality of output devices.

Various aspects of methods for aligning a light source to a target waveguide in a HAMR transducer on a slider will also be presented. In one exemplary embodiment, the method includes aligning an entrance of the target waveguide on the second surface of the HAMR transducer to the light source to direct light toward the first surface of the HAMR transducer, monitoring energy received at a plurality of output devices from a plurality of assistant waveguides in the HAMR transducer, and adjusting the alignment on the basis of the energy monitored at the output devices.

It is understood that other aspects of apparatuses and methods will become readily apparent to those skilled in the art from the following detailed description, wherein various aspects of presented herein by way of illustration. As will be realized, these aspects may be implemented in other and different forms and its several details are capable of modification in various other respects. Accordingly, the drawings and detailed description are to be regarded as illustrative in nature and not as restrictive.

FIG. 1 is a conceptual plan view of an exemplary embodiment of a HAMR disk drive. The HAMR drive disk 100 is shown with a rotatable magnetic disk 102. The magnetic disk 102 may be rotated on a spindle 104 by a disk drive motor (not shown) located under the magnetic disk 102. A head 106 may include read and write poles (not shown) that detect and modify the magnetic polarization of the recording layer on the disk's surface. The head 106 is generally integrally formed with a slider 108. The function of the slider 108 is to support the head 106 and any electrical connections between the head 106 and the rest of the HAMR disk drive 100. The slider 108 is mounted to a positioner arm 110 which may be used to move the head 106 on an arc across the rotating magnetic disk 102, thereby allowing the head 106 to access the entire surface of the magnetic disk 102. The arm 110 may be moved using a voice coil actuator 112 or by some other suitable means.

The slider 108 is aerodynamically designed to fly above the magnetic disk 102 by virtue of an air bearing created between the surface of the slider 108 and the rotating magnetic disk 102. This surface of the slider 108 is referred to as an air bearing surface (ABS). The ABS is the portion of the slider 108 surface which is closest to the rotating magnetic disk 102, which is typically the head 106. A HAMR transducer 114 may be coupled to the distal end of the slider 108 to assist writing data to the magnetic disk 102. The HAMR transducer 114 includes an NFT (not shown) aligned with the ABS of the slider 108. Light from a laser is coupled to the HAMR transducer 114 and guided by waveguide (not shown) to the NFT. The NFT focuses (or concentrates) the light to the magnetic disk 102, and heats a small region of the media. The head 106 magnetically writes data to the heated region of the media by energizing the write pole. When the heat source is no longer being applied (e.g., such as when the disk moves away from the head) the localized magnetic media cools and the written bit becomes thermally stable at ambient temperature.

Figure 2:
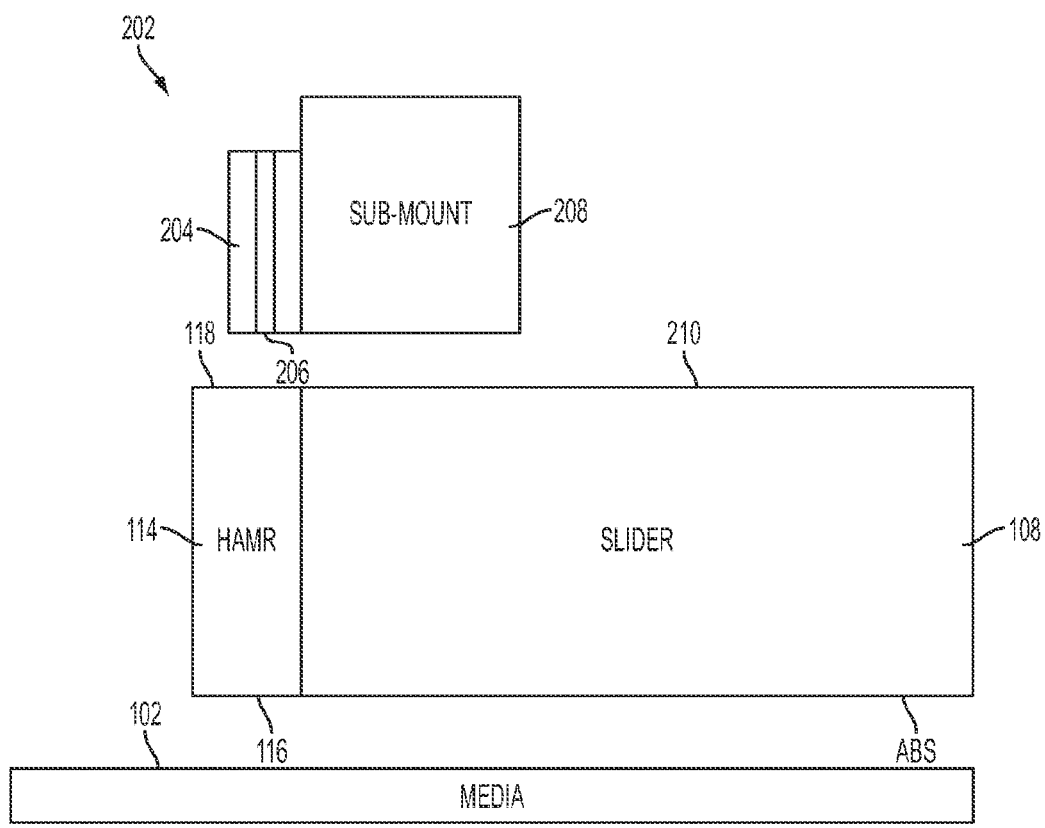
FIG. 2 is a conceptual elevation view of an exemplary embodiment of a slider with a HAMR transducer arranged with a light source.

FIG. 2 is a conceptual elevation view of an exemplary embodiment of a slider with an HAMR transducer arranged with a light source. The HAMR disk drive 100 includes the magnetic disk 102, a subassembly 202 and a slider 108. A HAMR transducer 114 is formed on the distal end of the slider 108. The subassembly 202 includes a light source, such as a laser diode 204 having an emission exit 206, attached to a submount 208. The slider 108 has a back side 210 to which the submount 208 may be bonded. In the embodiment shown, the back side 210 is opposite to the ABS. However, in other embodiments, the back side 210 (i.e. the side to which the submount 208 is bonded) may not be opposite to the ABS.

In an exemplary embodiment of the HAMR transducer 114, an assistant waveguide structure is disclosed where the main waveguide is an inverse taper waveguide (ITWG), i.e., the main waveguide at the input port may be smaller than in the case of a forward taper waveguide, and expands away from the input port.

The HAMR transducer 114 is discussed in more detail below. Briefly, the HAMR transducer 114 is mounted on a distal end of the slider 106 below the laser diode 204 such that a main (target) waveguide fabricated in the HAMR transducer 114 is aligned with the emission exit 206 of the laser diode 204. The HAMR transducer 114 may include a first surface 116 aligned to the ABS of the slider 108 and second surface 118 aligned to a surface of the slider 108 opposite the ABS. Adjacent to the target waveguide are one or more, but typically two or more, assistant waveguides adapted to detect light at respective input entrances from the laser diode 204 that may be measured to determine the alignment of the laser diode 204 with respect to the target waveguide. The assistant waveguides are spaced apart from the target waveguide sufficiently far so that there is negligible directional waveguide cross-coupling between the target and assistant waveguides, while still being arranged to admit light directly radiated from the emission exit 206 of the laser diode 204. With this configuration, there is no or minimal loss from the target waveguide due to directional coupling between waveguides.

Figure 3A:
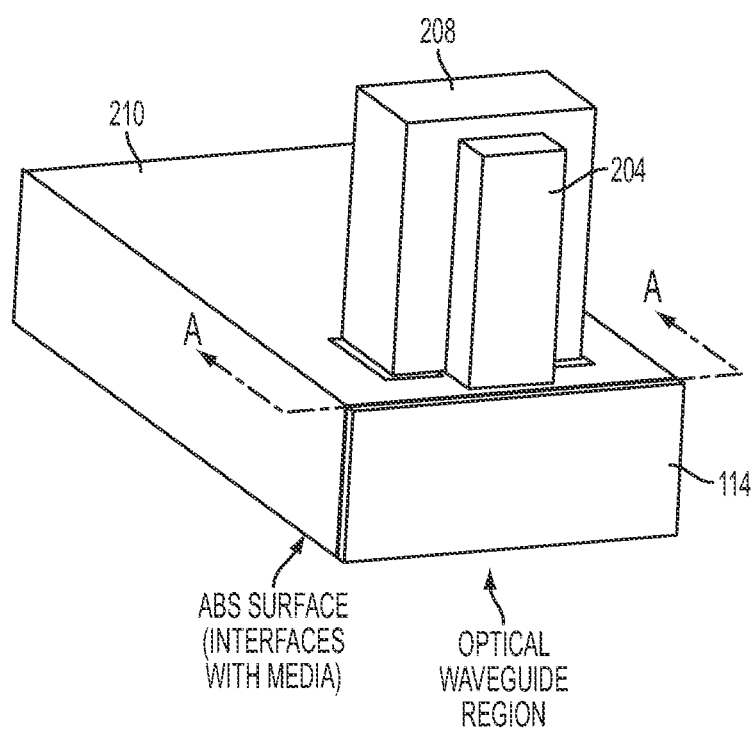
FIG. 3A is a conceptual perspective view of the exemplary embodiment of the slider with the HAMR transducer arranged with the light source of FIG. 2.
Figure 3B:
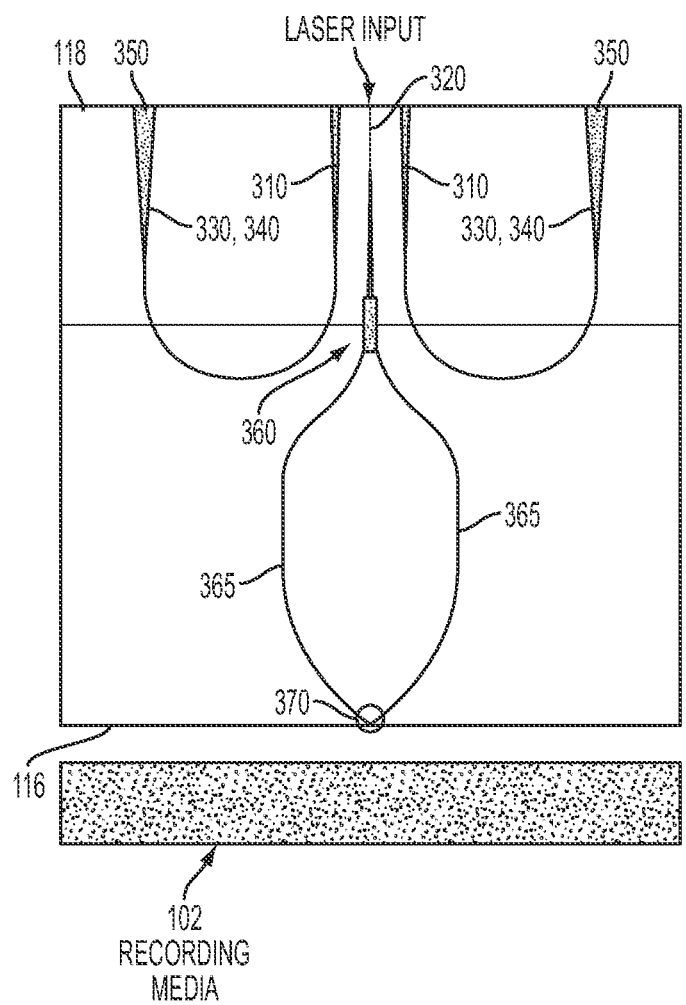
FIG. 3B is a schematic illustration of a cross-section elevation view of the HAMR transducer taken along line A-A of FIG. 3A.

FIG. 3A is a perspective view of the HAMR transducer 114 arranged with the light source 204 of FIG. 2. FIG. 3B is a schematic illustration of a cross-section elevation view of the HAMR transducer 114 taken along line A-A of FIG. 3A. For simplicity, only two assistant waveguides 310 are shown, and evaluation and/or control of alignment may be obtained in the horizontal direction, as viewed in FIG. 3B. However, as described below, more than two assistant waveguides 310 may be included so that evaluation and or alignment control may be obtained in two perpendicular axes. An ITWG 320 is shown between the two assistant waveguides 310 at the top of the figure (i.e., where laser light is input, which may be the second surface 118 of the HAMR transducer that is aligned to a surface of the slider 108 opposite the ABS), where assistant waveguides 310 are arranged on either sides. The two assistant waveguides 310 are shown each forming a U, for returning to exit ports 350 on a same edge of the HAMR transducer 114 as the input ports. However, the assistant waveguides 310 may be alternatively arranged to exit elsewhere in the HAMR transducer 114. In order to extract and detect light in each of the assistant waveguides 310, they may each expand into an exit taper 330 optionally arranged with an exit grating 340 over the expanded exit taper 330 of the assistant waveguide 310 so that light may be coupled out of the HAMR transducer 114 for detection by an optical sensor (e.g., optical detector, not shown). The output from the grating 340 can be analyzed to extract light coupling efficiency to the target waveguide, i.e., the ITWG 320, and laser diode 204 alignment offset as determined by difference measurements from the assistant waveguides 310 as light exits from the exit tapers 330 by means of the gratings 340. Alternatively, an optical sensor (not shown) may be placed directly in line with exit ports of each of the exit tapers 330, in which case a grating may or may not be used. In a further exemplary embodiment, if optical sensors are placed directly in line with the exit ports 350, there may not be a requirement for exit tapers 330 or gratings 340.

In an exemplary embodiment where the assistant waveguides 310 are symmetrically arranged about the target waveguide 320, a measurement of differences in the optical power in opposing assistant waveguides may provide an indication of the alignment of the target waveguide 320 with respect to the laser diode 204. In an exemplary embodiment of an active alignment system, the differential signals measured may be used to control the alignment of the HAMR transducer 114 with respect to the laser diode 204.

Figure 4A:
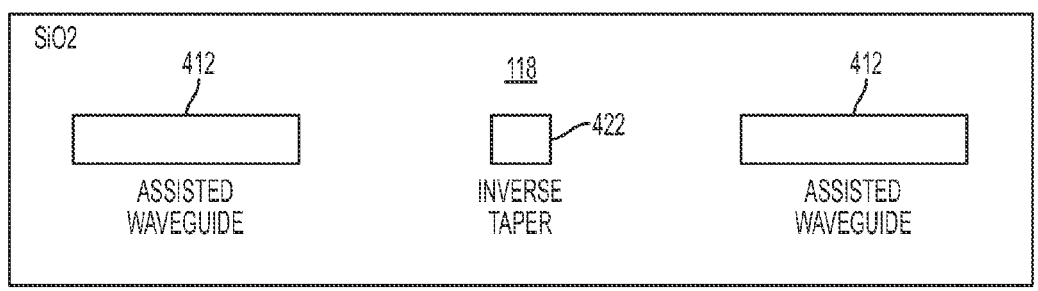
FIG. 4A is a conceptual plan view of an exemplary embodiment of a HAMR transducer showing a main waveguide and two assistant input ports.
Figure 4B:
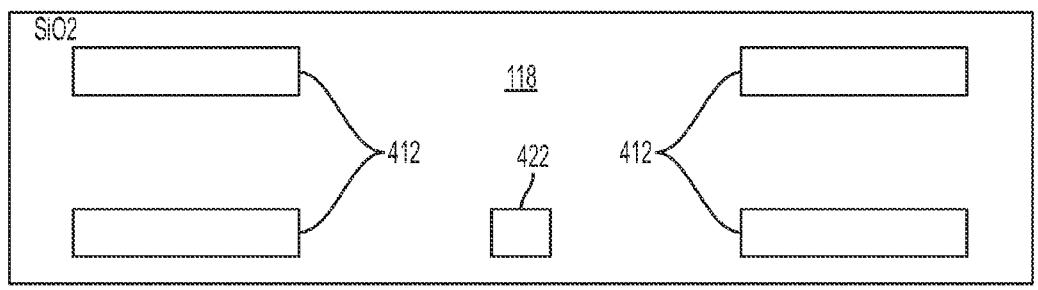
FIG. 4B is a conceptual plan view of an exemplary embodiment of a HAMR transducer showing a main waveguide and four assistant input ports.

FIG. 4A is a conceptual plan view of an exemplary embodiment of a HAMR transducer showing the entrance 422 to the target ITWG 320 and entrances 412 to the assistant waveguides 410 at the back (input) side of the HAMR transducer 114. This configuration is representative of the embodiment illustrated in FIG. 3B, and may be used to determine lateral alignment, i.e. alignment between the two assistant waveguides 310. FIG. 4B is a conceptual plan view of an exemplary embodiment of a HAMR transducer in which two pairs of assistant waveguides 310 are offset with respect to a plane bisecting the input target ITWG waveguide 320. This configuration enables (as viewed in the plane of the figure) simultaneous offset measurement of lateral (i.e., horizontal) and perpendicular (i.e., vertical) alignment. As may be seen in FIG. 4B, the target ITWG waveguide 320 entrance 422 is small relative to the assistant waveguide entrances 412, but then the target ITWG waveguide 320 expands as an inverse taper waveguide, as described above. The assistant waveguide entrances 412 are larger at first (i.e., have a larger cross-section area), but then initially taper to narrower cross-sections with distance from the entrances.

Returning to FIG. 3B, the target ITWG waveguide 320 has an inverse taper, i.e., it expands adiabatically in cross-section in at least one lateral dimension. The target waveguide 320 may be configured to direct energy provided by the light source from the entrance 422 (e.g., the second surface 118 of the HAMR transducer that is aligned to a surface of the slider 108 opposite the ABS) toward the opposing surface (e.g., the surface 116 aligned to the ABS of the slider). Under these conditions the waveguide supports transmission of a single mode within an inherently multimode waveguide. A multimode interferometric coupler/splitter 360 may be used to split the optical signal in the ITWG 320 into beams in two symmetrically arranged waveguides 365. The waveguides 365 may be arranged to merge the two optical beams interferometrically to resonantly excite a near field transducer (NFT) 370. The high intensity evanescent electric field produced by the NFT 370 at the ABS is highly localized to heat magnetic recording media positioned opposite and close to the ABS in a limited area of the media comparable to the size of the NFT 370. The NFT 370 may typically be smaller than half the optical wavelength of the laser diode 204 light emission.

As explained above, the assist waveguide structures can be used for measuring optical coupling efficiency within the target waveguide, and the laser diode alignment offset error with respect to the HAMR transducer may be determined based on optical signal difference comparisons between the assistant waveguides. In the various exemplary embodiments presented throughout this disclosure, the coupling efficiency may be assessed without significantly impacting the energy in the inverse taper portion. The assistant waveguides are arranged along both sides of a main target ITWG waveguide without using directional couplers. In one exemplary non-limiting embodiment, the separation between either one of the two assistant waveguides and the main target ITWG waveguide may be about 1.5-3 um, or greater. With this separation assistant waveguides may have a minimal impact on the coupling loss due to direct waveguide cross-coupling, while collecting some light power that might otherwise be scattered away within the slider.

The above-described device may thus be operated to perform a method for aligning a light source to a target waveguide in the HAMR transducer on a slider. The method may include aligning the entrance 422 of the target waveguide 320 on the surface 118 (i.e., the surface of the HAMR transducer 114 aligned to the surface of the slider 108 opposite the ABS) to the light source 204 to direct light toward the surface 116 (i.e., the surface of the HAMR transducer aligned to the ABS). The target waveguide 320 may expand in cross-section area with distance from the entrance 422 to form an inverse taper waveguide. Energy received at a plurality of output devices 330, 340, 350 from a plurality of assistant waveguides 310 in the HAMR transducer 114 may be monitored. Each of the plurality of assistant waveguides 310 may have an entrance 412 at the second surface 118 of the HAMR transducer 114 to receive portions of the light directly from the light source 204. The alignment may be adjusted on the basis of the energy monitored at the output devices 330, 340, 350.

The method may also include outputting light to an output device 330, 340, 350 corresponding to each of the assistant waveguides 310. The light beam may be split with a multimode interference splitter from the target waveguide 320. The split light may be delivered to the first surface 116 at a convergent point.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A heat assisted magnetic recording (HAMR) transducer on a slider comprising:
   first and second opposing surfaces, wherein the first surface is aligned to an air bearing surface (ABS) of the slider and the second surface is aligned to a surface of the slider opposite the ABS;
   a target waveguide having an entrance at the second surface, the target waveguide being configured to direct energy provided by a light source from the entrance toward the first surface, wherein the target waveguide expands in cross-section area with distance from the entrance to form an inverse taper waveguide; and
   a plurality of assistant waveguide each having an entrance at the second surface, wherein the plurality of assistant waveguides are configured to direct energy to a plurality of output devices.

2. The HAMR transducer of claim 1, wherein the light source comprises a laser diode.

3. The HAMR transducer of claim 1, wherein the assistant waveguides are arranged at the second surface at a separation distance of at least one and one-half micron to receive light by direct illumination from the light source, while not exhibiting directional coupling between the target waveguide and any of the assistant waveguides.

4. The HAMR transducer of claim 1, wherein each of the assistant waveguides comprises a cross-section area at the entrance larger than a cross-section area of the target waveguide entrance.

5. The HAMR transducer of claim 1, wherein each of the assistant waveguides comprises a forward taper that initially decreases in cross-section area with distance from the entrance.

6. The HAMR transducer of claim 1, wherein each of the plurality of assistant waveguides is configured to have a portion with an expanded cross-section to couple to an output device.

7. The HAMR transducer of claim 6, wherein the expanded portion of each of the assistant waveguides couple to a grating to direct the light from the assistant waveguide to the output device.

8. The HAMR transducer of claim 1, further comprising a multimode interference splitter to split light from the target waveguide, and a plurality of optical waveguides to deliver the split light to the first surface at a convergent point.

9. The HAMR transducer of claim 8, wherein the plurality of optical waveguides comprises two waveguides, and wherein the multimode interference splitter is configured to split the light into the two waveguides.

10. The HAMR transducer of claim 8 further comprising a near field transducer at the convergent point.

11. A method for aligning a light source to a target waveguide in a heat assisted magnetic recording (HAMR) transducer on a slider, the HAMR transducer comprising a first and second opposing surfaces, wherein the first surface is aligned to an air bearing surface (ABS) of the slider and the second surface is aligned to a surface of the slider opposite the ABS, the method comprising:
 aligning an entrance of the target waveguide on the second surface of the HAMR transducer to the light source to direct light toward the first surface of the HAMR transducer, wherein the target waveguide expands in cross-section area with distance from the entrance to form an inverse taper waveguide;
 monitoring energy received at a plurality of output devices from a plurality of assistant waveguides in the HAMR transducer, each of the plurality of assistant waveguides having an entrance at the second surface of the HAMR transducer to receive portions of the light directly from the light source; and
 adjusting the alignment on the basis of the energy monitored at the output devices.

12. The method of claim 11, wherein the light source comprises a laser diode.

13. The method of claim 11, wherein the assistant waveguides are arranged at the second surface of the HAMR transducer at a distance of at least one and one-half micron to receive the light by direct illumination from the light source, while not exhibiting directional coupling between the target waveguide and any of the assistant waveguides.

14. The method of claim 13, wherein each of the assistant waveguides comprises a cross-section area at the entrance larger than a cross-section area of the target waveguide entrance.

15. The method of claim 13, wherein each of the assistant waveguides comprises a forward taper that initially decreases in cross-section area with distance from the entrance.

16. The method of claim 15, comprising outputting light to an output device corresponding to each of the assistant waveguides, wherein each of the plurality of assistant waveguides is configured to have a portion with an expanded cross-section arranged with the output device.

17. The method of claim 16, wherein the expanded portion of each of the assistant waveguides couple to a grating to direct the light from the assistant waveguide to the output device.

18. The method of claim 11, comprising:
 splitting the light beam with a multimode interference splitter from the target waveguide; and
 delivering the split light to the first surface at a convergent point.

19. The method of claim 18, wherein the plurality of optical waveguides comprises two waveguides, and wherein the multimode interference splitter is configured to split the light into the two optical waveguides.

20. The method of claim 18, further comprising a near field transducer at the convergent point.

21. A hard disk drive comprising a heat assisted magnetic recording (HAMR) transducer on a slider, the HAMR transducer comprising:
 first and second opposing surfaces, wherein the first surface is aligned to an air bearing surface (ABS) of the slider and the second surface is aligned to a surface of the slider opposite the ABS;
 a target waveguide having an entrance at the second surface, the target waveguide being configured to direct energy provided by a light source from the entrance toward the first surface, wherein the target waveguide expands in cross-section area with distance from the entrance to form an inverse taper waveguide;
 a plurality of assistant waveguides each having an entrance at the second surface, wherein the plurality of assistant waveguides are configured to direct energy to a plurality of output devices.

* * * * *